(12) United States Patent
Chen et al.

(10) Patent No.: US 8,028,663 B2
(45) Date of Patent: Oct. 4, 2011

(54) COMPLIANT HOLDER DEVICE FOR ANIMAL IMAGING AND SURGERY

(75) Inventors: Shih-Chi Chen, Boston, MA (US); Zihao Zhang, Melbourne, FL (US); Martin L. Culpepper, Danvers, MA (US)

(73) Assignees: Massachusetts Institute of Technology, Cambridge, MA (US); The General Hospital Corporation, Boston, MA (US)

( * ) Notice: Subject to any disclaimer, the term of this patent is extended or adjusted under 35 U.S.C. 154(b) by 0 days.

(21) Appl. No.: 12/575,704

(22) Filed: Oct. 8, 2009

(65) Prior Publication Data
US 2011/0083614 A1 Apr. 14, 2011

(51) Int. Cl.
*A01K 15/00* (2006.01)
(52) U.S. Cl. .......................................... 119/729; 119/815
(58) Field of Classification Search .................. 119/729, 119/712, 734, 755, 756, 814, 815, 751, 753, 119/757, 752, 417
See application file for complete search history.

(56) References Cited

U.S. PATENT DOCUMENTS

| | | | | |
|---|---|---|---|---|
| 3,023,734 A | * | 3/1962 | Schaub | 119/729 |
| 3,250,252 A | * | 5/1966 | Leopold | 119/756 |
| 3,625,185 A | * | 12/1971 | Kester | 119/58 |
| 4,254,767 A | * | 3/1981 | Mixon, Jr. | 604/181 |
| 4,269,149 A | * | 5/1981 | Thomas | 119/729 |
| 4,549,501 A | * | 10/1985 | Anderson et al. | 119/729 |
| 4,620,540 A | | 11/1986 | Goodale | |
| 5,320,069 A | * | 6/1994 | Anderson et al. | 119/751 |
| 6,651,587 B1 | * | 11/2003 | DeFord et al. | 119/420 |
| 7,162,977 B1 | * | 1/2007 | Charvat | 119/751 |

OTHER PUBLICATIONS

Harvard Apparatus, "Cunningham Mouse/Neonate Rat Stereotaxic Adaptors" advertisement (visited Aug. 20, 2009), <http://www.harvardapparatus.com/webapp/wcs/stores/servlet/product_11051_10001_41646_-1_HAI_ProductDetail>.
Harvard Apparatus, "Harvard Apparatus, Cunningham Mouse/Neonate Rat Stereotaxic Adaptors" advertisement, larger view of featured image (visited Aug. 20, 2009), <viewed by clicking "Larger Views" at http://www.harvardapparatus.com/webapp/wcs/stores/servlet/product_11051_10001_41646_-1_HAI_ProductDetail>.

* cited by examiner

*Primary Examiner* — T. Nguyen
(74) *Attorney, Agent, or Firm* — Modern Times Legal; Robert J. Sayre (57) ABSTRACT

A compliant holder device for constraining an animal includes a device body, a nose cone, and compliant flexure arms having contact surfaces for constraining the animal's head. In use, an animal is placed on the device body, and the nose of the animal is placed in the nose cone to constrain the skull at the nose. The compliant flexure arms are flexed to increase the distance between the contact surfaces of respective compliant flexure arms, and the ears of the animal are placed between the contact surfaces of the flexed compliant flexure arms, wherein the flex in the compliant flexure provides pressure to and constrains the skull at the ears.

17 Claims, 6 Drawing Sheets

COMPLIANT HOLDER DEVICE FOR ANIMAL IMAGING AND SURGERY

BACKGROUND

In biomedical/clinical research fields, live animal studies provide a plethora of medical breakthroughs. Advanced laser-scanning microscopes, such as a confocal or multi-photon microscope, are extensively used for in vivo experiments to characterize the 3-D microscopic tissue structure. The state-of-the-art laser-scanning microscopes provide submicron-level resolution.

SUMMARY

Although advanced microscopes provide high resolution, the capability of the microscope may not be fully exploited in the context of imaging live animal (e.g., mouse) tissue due to motions generated by the animal's heartbeats, breathing, and convulsions, even with the use of anesthesia. These motions are on the scale from tens of microns to a few millimeters and thus result in degraded or blurred images. Equally important, low-cost precision constraint devices can be highly advantageous for many animal surgeries.

A compliant holder device and a method of using a compliant holder device to constrain the movement of an animal are described herein. Various embodiments of the device and method may include some or all of the elements, features and steps described below.

A compliant holder device for constraining an animal includes a device body, a nose cone, and compliant flexure arms having contact surfaces for constraining a head of the animal. An animal (having a skull, nose and ears) is placed on the device body. The nose of the animal is placed in the nose cone to constrain the skull at the nose, and the compliant flexure arms are flexed to increase the distance between the contact surfaces of respective compliant flexure arms. The ears (i.e., at least part of the ear organs) of the animal are placed between the contact surfaces of the flexed compliant flexure arms; and the flex in the compliant flexure arms then provides pressure to and constrains the skull at the ears.

The compliant holder device and methods for using it can enhance microscopy performance during live animal study by bridging the mismatch between microscopy resolution and motion constraint. Another advantage of the device and methods can include the low cost of manufacture of the device, which can render the compliant holder device suitable for disposable use (e.g., dispose and replace after each use). Alternatively, the top band with the compliant flexure arms can be subject for disposal after each use, while the device body is retained. Another advantage of the device and methods can include provision of a compression mechanism (i.e., the compliant flexure arms) that inherently provides the desired, controlled force without any need for manual adjustment. Additionally, the device can be used to humanely study animal tissue, as imaging or other process can be carried out without having to kill the animal, thereby allowing animals to be repeatedly tested and reducing the number of animal subjects needed for an experiment.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, terms (including technical and scientific terms) used herein have the same meaning as commonly understood by one of ordinary skill in the art to which this invention belongs. It will be further understood that terms, such as those defined in commonly used dictionaries, are to be interpreted as having a meaning that is consistent with their meaning in the context of the relevant art and are not to be interpreted in an idealized or overly formal sense unless expressly so defined herein. For example, if a particular composition is referenced, practical, imperfect realities may apply; e.g., the potential presence of at least trace impurities (e.g., at less than 0.1% by weight or volume) can be understood as being within the scope of the description.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures.

For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms "a," "an" and "the" are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

The embodiments of the holder device that are discussed below and illustrated in the drawings are primarily referenced for use in constraining a mouse, though the size and dimensions of the device can readily be reconfigured for similarly constraining other animals in accordance with this invention.

Figure 1:
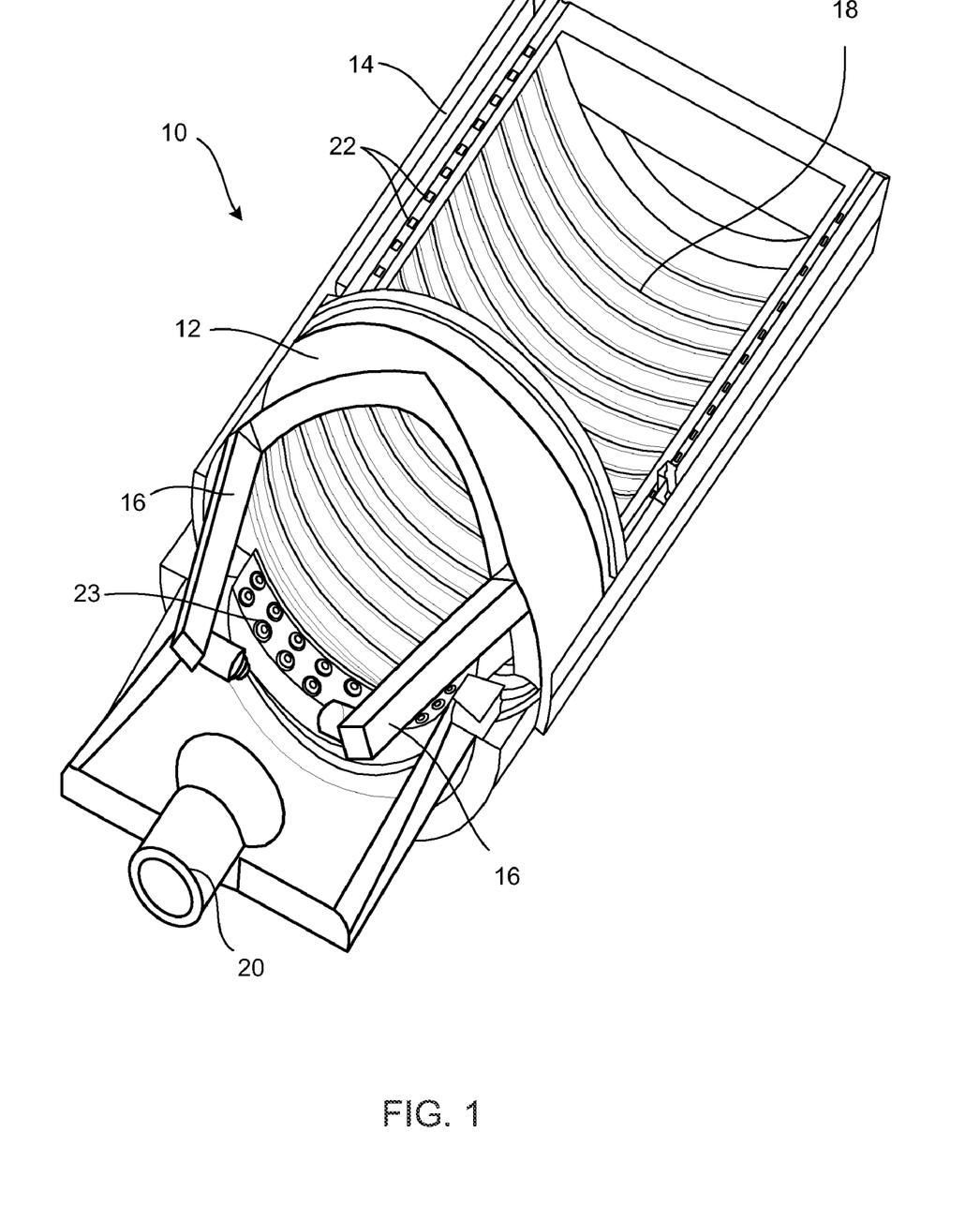
FIG. 1 is a perspective view of a first embodiment of a compliant holder device.

A first embodiment of a low-cost compliant mouse holder device 10 is shown in FIG. 1. This holder device 10 has been experimentally demonstrated to reduce the motions generated by the mouse's head, which can be generated due, e.g., to breathing, heart beats, or convulsions (due to incomplete anesthesia) to no more than +/−1 µm. The compliant holder device includes (a) a top band 12 that incorporates a pair of compliant flexure arms 16 that apply calibrated pressure to the mouse ears and (b) a device body 14 that defines a semi-cylindrical cavity 18 that houses the mouse. The top band 12 can be securely coupled with the device body 14 via, e.g., a releasable cantilever snap fit mechanism, wherein a hook extending from one of the parts latches into a cavity in the other part or via an elastic band (e.g., a rubber band) encircling the two parts 12 and 14 and elastically stretched to press the parts together.

Depending on the animal to be constrained, the semi-cylindrical cavity 18 can have a radius of about 8 to about 250 mm; in particular embodiments, the radius can be in the range from about 8 to about 200 mm; and in more-particular embodiments, the radius can be in the range from about 8 to 100 mm.

The device body also includes a nose cone 20 that provides anesthesia and helps to constrain the motion of a mouse at its nose (i.e., the area around the animal's nasal passages). Moreover, the device body 14 can further include buried coils 22 that maintain a mouse's body temperature (e.g., at 37° C.) as well as a compliant neck band 23 to prevent the mouse from sliding along the length of the device body 14. Both the top band 12 and the device body 14 can be formed of a plastic, such as polycarbonate, which is comparatively hard and durable, or nylon, which is comparatively soft and flexible. The overall dimensions of a compliant holder device 10 designed for holding a mouse can be about four inches (about 10 cm) in length and two inches (about 5 cm) in height and width.

The compliant holder device 10 enables the use of a microscope to achieve better resolution and penetration for imaging the results of any experiments on the mouse's head. Examples of such imaging include the study of stem cells in the bone marrow cavity of a mouse skull and the study of retina tissues/cells in the mouse eye. Note that the design can be readily resized (e.g., increased in size) and modified to constrain other animals, such as rats, guinea pigs, or rabbits. By virtue of its design, the compliant holder device 10 treats the subjects humanely by applying calibrated pressure and force.

Figure 2:
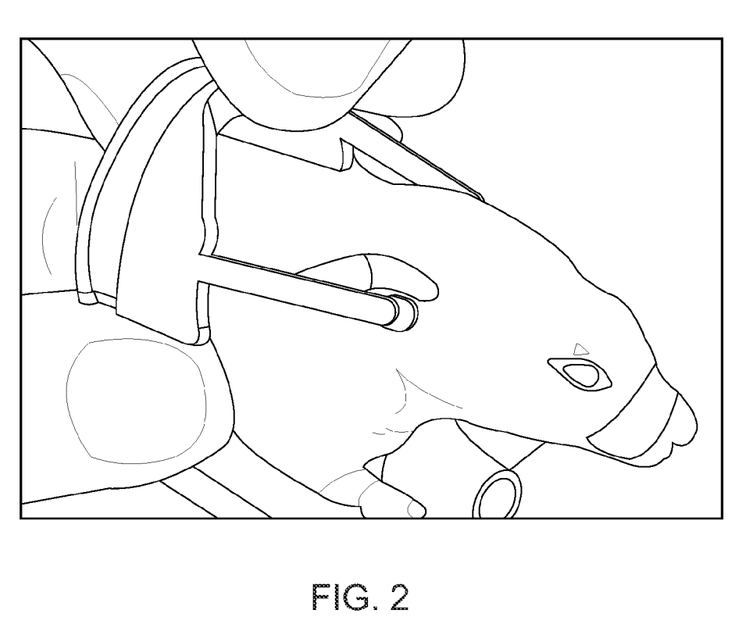
FIG. 2 is an image of a mouse on the device body of the compliant holder device of FIG. 1, wherein the mouse is being fitted with a band that incorporates the compliant flexure arms.
Figure 3:
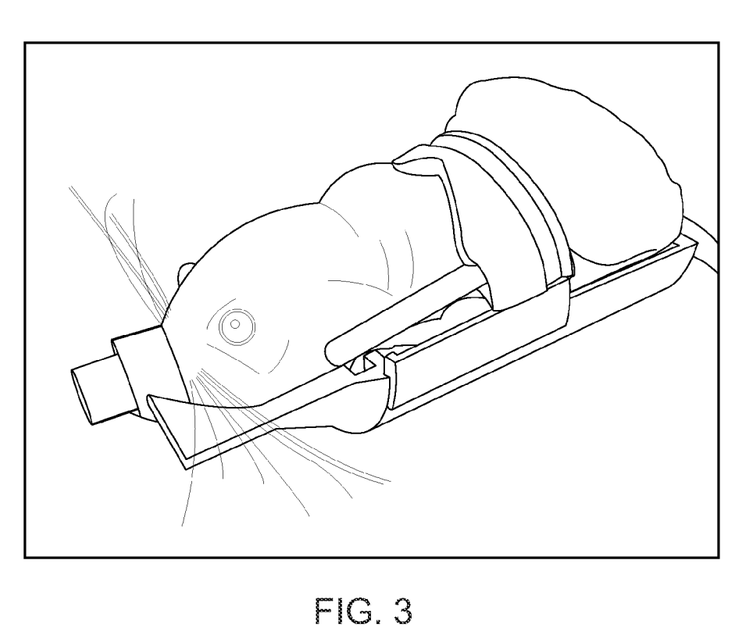
FIG. 3 is another image of the mouse and compliant holder device shown in FIG. 2, wherein the band has been secured to the device body, and the compliant flexure arms and the nose cone constrain the mouse's head.

The compliant flexure arms 16 can effectively apply designed force/pressure to the mouse ear and can constrain motion of the mouse head, as shown in FIGS. 2 and 3. The preload generated by the compliant flexure arms 16 can be adjusted by changing the length and cross section of the arms (e.g., shortening the length of the arms and increasing the cross section of the arms can stiffen the arms and thereby increase the compressive force applied by the arms on the mouse's skull); and the flexure arms 16 can be designed to provide a different preload force depending on the animal to be constrained by the device. The compliant flexure arms 16 of the device holder 10 can have a stiffness of about $2.72 \times 10^3$ N/m; and a displacement of about 5 mm for each arm (about 20% strain) accommodates insertion of the mouse's head and can provide 7 N preload between the ears (specifically, at the concave structures of the tympanic bulla on opposite sides of the mouse's skull), as shown in FIGS. 2 and 3, to constrain the mouse's skull. The compressive load provided by the compliant flexure arms 16 on the animal skull will be less than the fracture load of the skull (typically, about 300 N in the case of a mouse)

Depending on the animal to be constrained, the compliant flexure arms can have a width of about 15 to about 200 mm, a height of about 15 to about 200 mm, and a length of about 60 to about 500 mm. In particular embodiments, the width and height can be in the range from about 15 to about 150 mm, and the length can be in the range from about 60 to about 350 mm. In more-particular embodiments, the width and height can be in the range from about 15 to about 100 mm, and the length can be in the range from about 60 to about 250 mm.

Figure 4:
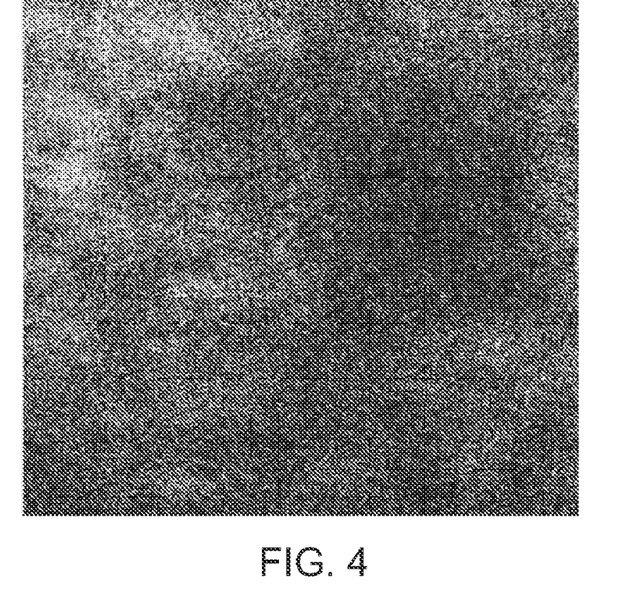
FIG. 4 is an image taken of the inside of the bone marrow cavity of an anesthetized mouse taken without using the compliant holder device; as is evident from inspection, the image is not very clear.
Figure 5:
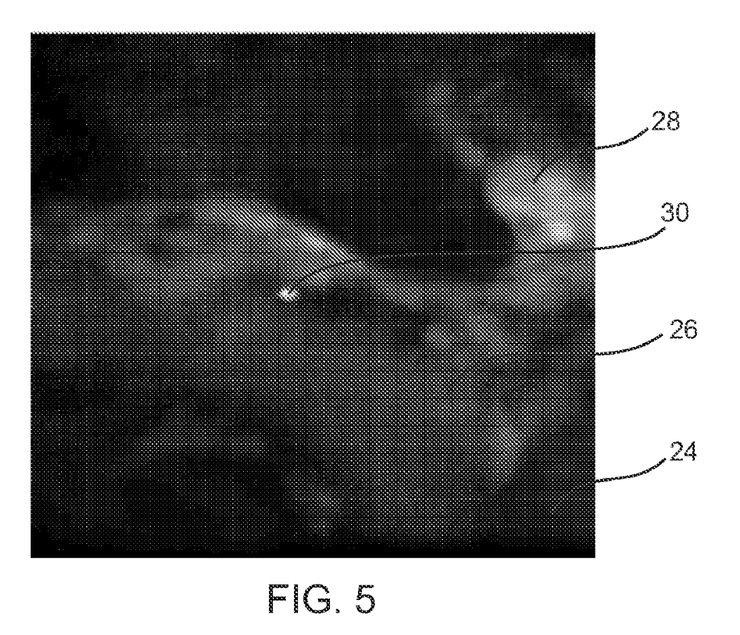
FIG. 5 an image similar to that of FIG. 4, except that a compliant holder device is used; as is evident via comparison, the image of FIG. 5 is much clearer than that of FIG. 4.
Figure 6:
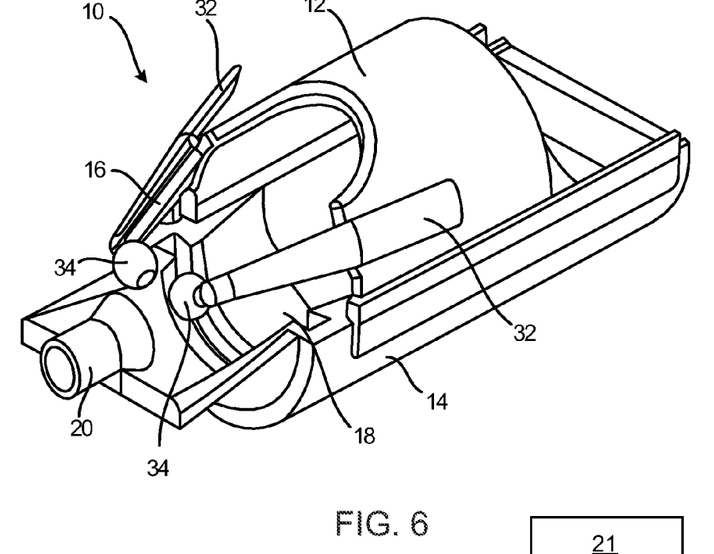
FIG. 6 is a perspective view of a second embodiment of a compliant holder device.
Figure 7:
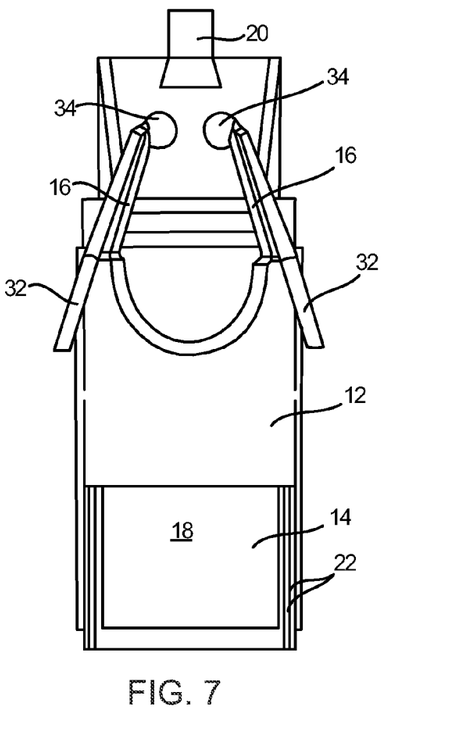
FIG. 7 is a top view of the compliant holder device of FIG. 6.
Figure 8:
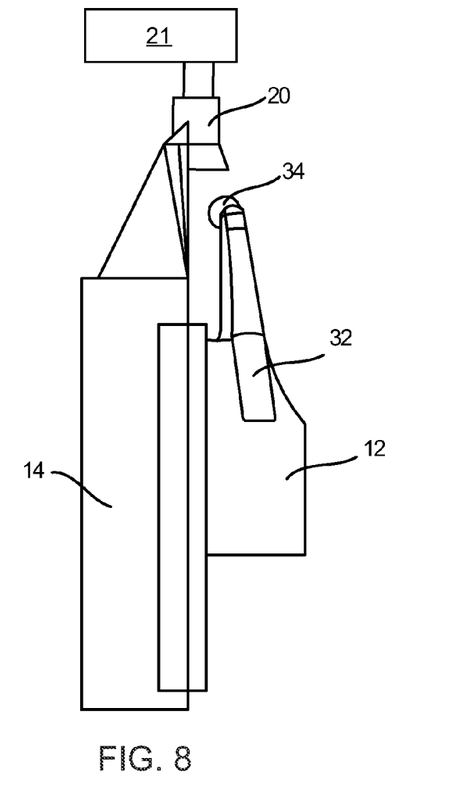
FIG. 8 is a side view of the compliant holder device of FIGS. 6 and 7.
Figure 9:
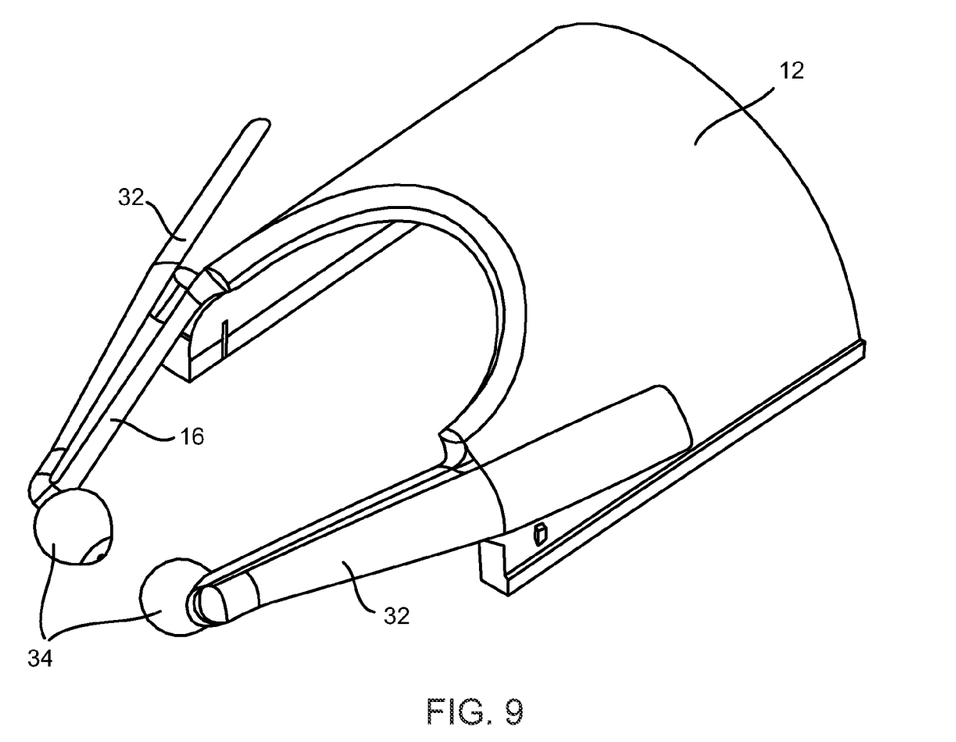
FIG. 9 is a perspective view of the top band of the compliant holder device of FIGS. 6-8.
Figure 10:
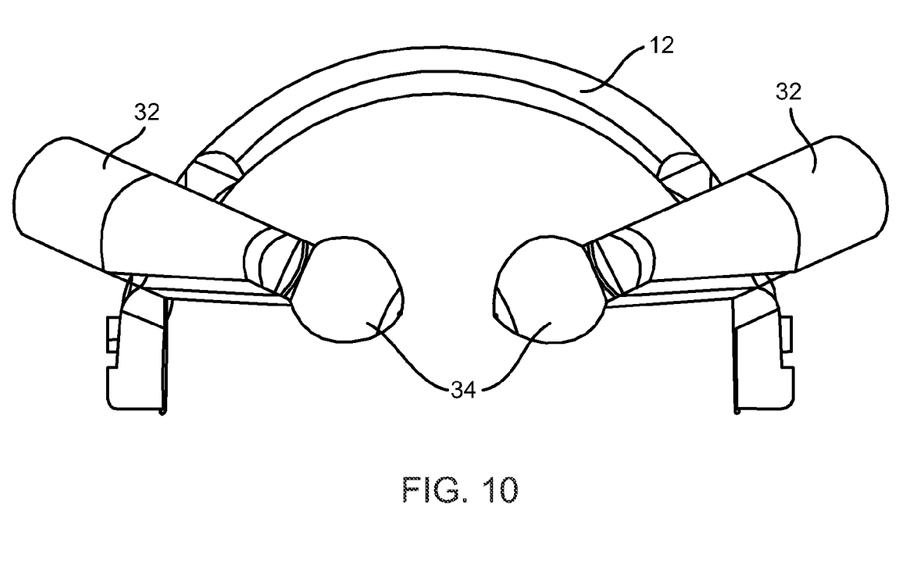
FIG. 10 is an end view of the top band of FIG. 9.
Figure 11:
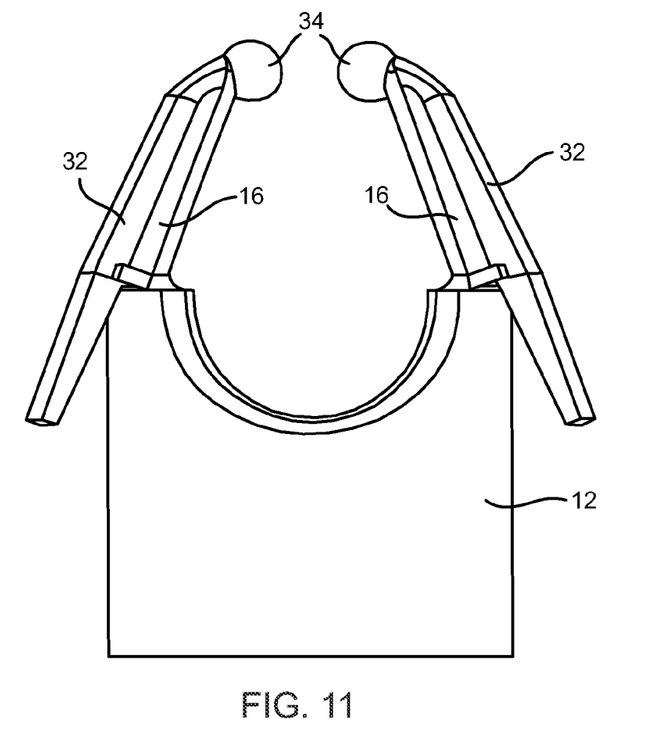
FIG. 11 is a top view of another embodiment of the top band.
Figure 12:
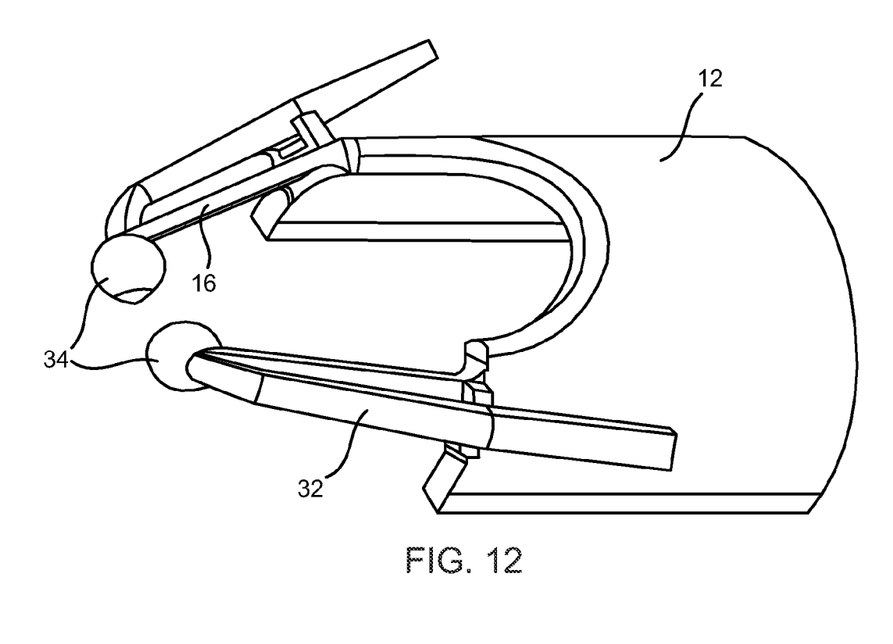
FIG. 12 is a perspective view of the top band of FIG. 11.

The complaint flexure arms 16 provide a high degree of mobility yet maintain high stiffness. The arms 16 are able to constrain mice having different head sizes. In addition, the preload from the arms 16 allow little movement; and real-time microscopy tests have been shown to accurately image objects in the regime of 1 µm. Examples of images of the inside of the bone marrow cavity of an anesthetized mouse taken with and without the device holder are provided in FIGS. 4 and 5, respectively. The frame size of these figures is about 400 µm×400 µm. In FIG. 5, one can clearly see bone 24, vasculature 26, osteoblasts 28 and an injected stem cell 30 inside the bone marrow cavity (these structures can be even more readily distinguished in a color version of this image). As can clearly be seen from these images, use of the device holder can produce an image (FIG. 5) that is of much higher resolution and clarity.

A second embodiment of a compliant holder device 10 is shown in FIGS. 6-12. In this embodiment, a pair of opening levers 32 extend to an opposite end of the compliant flexure arms 16 from a pair of rounded contact surfaces 34 (in this case, in the form of spheres) that ease stress on the ear tissue, while maintaining a stable hold. The opening levers 32 are attached to the rounded contact surfaces 34 of the flexure arms allow users to pry open the compliant flexure arms 16 (to provide a larger opening therebetween) with one hand and in one motion. As shown, in this embodiment, the opening levers 32 are mounted on a fulcrum 36 at the base of each compliant flexure arm 16 to facilitate the pivoting mechanism for expanding the gap between the contact surfaces 34. The opening levers 32 either can be connected with the compliant flexure arms 16 or can be an integral extension of the compliant flexure arms 16.

As shown in FIGS. 1 and 6-8, the device body 14 includes a semi-cylindrical cavity 18 of 15 mm radius that houses the body of an animal (e.g., a mouse). The nose cone 20 is mounted on the device body 12 and is coupled with a 3/16-inch (about 0.5-cm) diameter conduit for anesthesia from a source 21 (e.g., a tank of anesthesia). The nose cone 20 serves the following two functions: (1) to provide anesthesia to the animal and (2) to help constrain motion of the nose of the animal. Together with compliant flexure arms 16, the nose cone 20 fully constrains an animal skull after pressure is applied to both ears and after the nose is inserted into the nose cone 20, as shown in FIG. 3. The device body 14 again also includes buried heating coils 22 (or a resistive heating composition) to provide heat to help maintain the animal's normal body temperature. Inside the semi-cylindrical cavity 18, the device body 14 can be lined with soft rubber or rubber-like grip bars to prevent the device body 14 from slipping on angled platforms. The grooved ribs provide additional axially support to the animal.

The compliant holder device can be manufactured using three-dimensional (3D) printing techniques (e.g., at the Massachusetts Institute of Technology's Precision Compliant Systems Lab in the Department of Mechanical Engineering). In one embodiment of the 3D printing technique, the device holder is fabricated by printing successive micron-thick layers of plastic (e.g., polycarbonate or nylon), varying the profile for each layer. The 3D printer allows for more complexity in the fabricated mouse holder.

Alternatively, the compliant holder device 10 can be fabricated by plastic injection molding using permanent molds shaped to produce the band 12, and the device body 14. An injection molding machine holds the permanent molds, which can be made of steel or a durable metal. Each mold can include two pieces—e.g., a top and bottom. The molds can be fabricated using a computer numerical control (CNC) milling machine. An injection molding machine can feed in hot melted plastic (e.g., polycarbonate or nylon) into the mold. Drying time is fairly quick and once dried, the machine ejects the plastic part.

The compliant holder device 10 and the methods for using the device 10 to constrain an animal can be used in a variety of applications including, for example, mobile stereotaxic surgeries, surgical injection, eye/brain imaging, precision dissection, etc.

In describing embodiments of the invention, specific terminology is used for the sake of clarity. For the purpose of description, each specific term is intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. Appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A compliant holder device for an animal, comprising:
   a device body configured to hold an animal, the device body including a head region toward one end of the device body; and
   opposing compliant flexure arms incorporated into a band that is configured for detachably mounting on the device body, wherein the band and the device body surround an animal confinement volume, the compliant flexure arms including contact surfaces that are positioned over the head region of the device body when the compliant flexure arms are mounted on the device body, wherein the compliant flexure arms are configured in opposition to one another to enable the contact surfaces of the compliant flexure arms to be flexed away from each other and to apply pressure to an object between the contact surfaces when the compliant flexure arms are flexed and the contact surfaces contact the object.

2. The compliant holder device of claim 1, further comprising a nose cone for holding and constraining an animal held by the device body about its nose, wherein the nose cone is mounted on the device body and positioned at the head region of the device body.

3. The compliant holder device of claim 1, further comprising a source of anesthesia coupled with the nose cone to feed anesthesia through the nose cone.

4. The compliant holder device of claim 1, wherein each flexure arm has a rounded end that serves as the contact surface of the flexure arm.

5. The compliant holder device of claim 1, wherein each flexure arm includes a lever extending to a position remote from the contact surface, wherein the compliant flexure arms are mounted on a fulcrum to enable squeezing the levers inwardly toward each other on one side of the fulcrum and pivoting the contact surfaces outwardly away from each other on an opposite side of the fulcrum.

6. The compliant holder device of claim 1, wherein the device body defines a substantially semi-cylindrical cavity for holding an animal.

7. The compliant holder device of claim 6, wherein the substantially semi-cylindrical cavity has a radius of about 8 mm to about 250 mm.

8. The compliant holder device of claim 6, wherein the substantially semi-cylindrical cavity is defined by a grooved surface on the device body, wherein the grooves are perpendicular to a long axis of the device body.

9. The compliant holder device of claim 1, wherein the device body includes a heating element for generating heat.

10. The compliant holder device of claim 1, wherein an animal is mounted between and constrained by the band and the device body.

11. The compliant holder device of claim 10, wherein the animal is selected from a mouse, a rat and a rabbit.

12. The compliant holder device of claim 10, wherein the animal has nasal and ear areas, and wherein the nose cone holds and constrains the animal around its nasal area and the contact surfaces of the compliant flexure arms contact and constrain the animal at its ear areas.

13. The compliant holder device of claim 1, wherein the compliant flexure arms have sufficient flexural elasticity and flexural strength to provide a compressive force of between 1 and 300 Newtons on a skull mounted between the arms when flexed.

14. The compliant holder device of claim 1, wherein the compliant holder device is formed by injection molding.

15. The compliant holder device of claim 1, wherein the compliant holder device is sized to be held in a human hand, and where the compliant flexure arms are configured to be opened or released by fingers of the human hand with one motion while holding the compliant holder device.

16. The compliant holder device of claim 1, wherein the compliant flexure arms and the device body are formed substantially of plastic.

17. The compliant holder device of claim 10, wherein the animal has a skull and the compliant flexure arms provide a preload compressive force on the skull that is less than the fracture load of the skull yet sufficient to constrain motion of the skull for accurate microscopic imaging of objects of about 1 µm without killing the animal.

* * * * *